A. REUBOLD.
MEAT COOKER.
APPLICATION FILED MAR. 18, 1911.
1,006,792.
Patented Oct. 24, 1911.
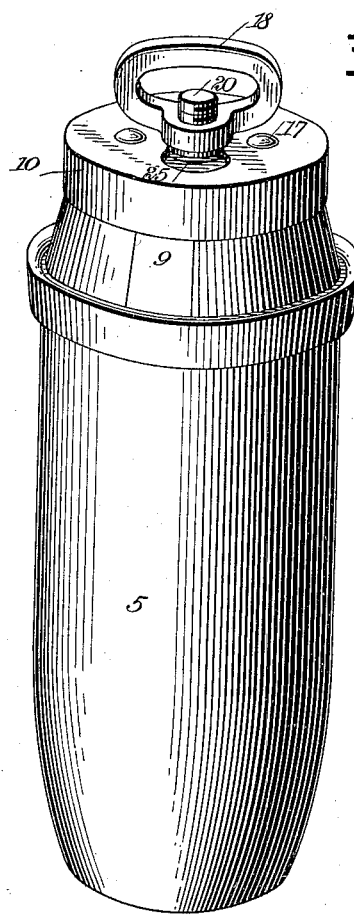
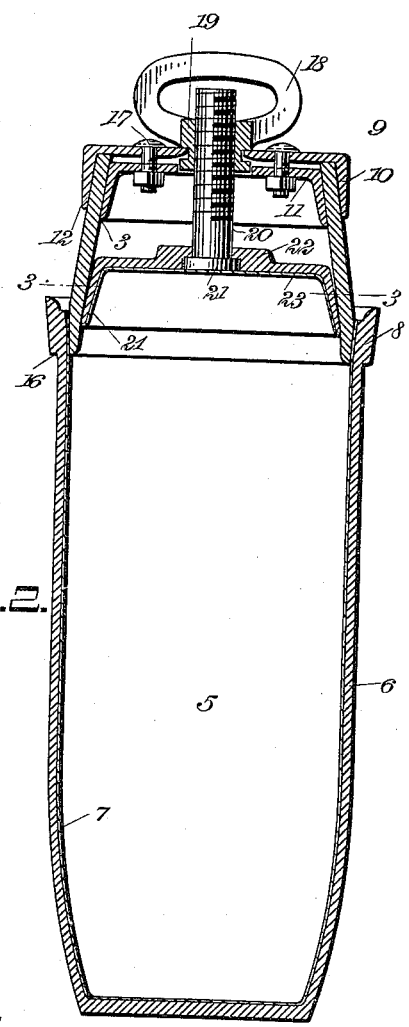
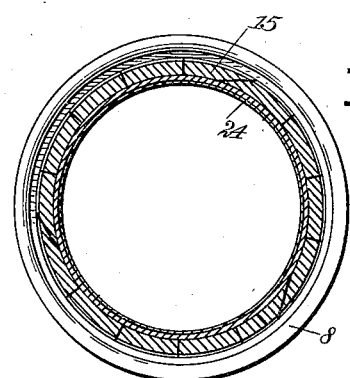
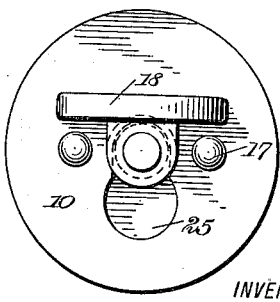
WITNESSES:
G. Robert Thomas
W. S. Orton.
INVENTOR
Adam Reubold
BY Munn & Co
ATTORNEYS

UNITED STATES PATENT OFFICE.

ADAM REUBOLD, OF NEW YORK, N. Y.

MEAT-COOKER.

1,006,792.

Specification of Letters Patent.   Patented Oct. 24, 1911.

Application filed March 18, 1911.  Serial No. 615,218.

*To all whom it may concern:*

Be it known that I, ADAM REUBOLD, a citizen of the United States, and a resident of the city of New York, borough of the Bronx, in the county and State of New York, have invented a new and Improved Meat-Cooker, of which the following is a full, clear, and exact description.

My invention relates to a new and improved form of meat cooker, and more particularly adapted to that form of meat cooker in which the meat is inclosed in an air-tight receptacle.

An object of my invention is to provide an air-tight receptacle, in which meat or other food may be placed, and more particularly to provide a means for closing this air-tight receptacle, so that the juices and volatile parts of the meat will be retained, thereby preserving the flavor of the meat, preventing shrinkage, and increasing its value as an article of food, the particular use for which my improved device is best adapted, being the cooking of bone hams and shoulders of pork, so as to preserve their flavor, juices and aroma.

I attain the above-outlined objects by providing an expansible cap to fit the opening of the receptacle, so constructed that the cap may be pressed down into tight engagement with the meat, and then expanded to firmly contact with the inside of the receptacle.

With the above and other objects in view, as will more fully hereinafter appear, the present invention consists in certain novel details of construction and arrangement of parts hereinafter fully described, illustrated in the accompanying drawings and more particularly pointed out in the appended claims.

Reference is to be had to the accompanying drawings, forming a part of this specification, in which similar characters of reference indicate corresponding parts in all the figures, and in which—

Figure 1 is a perspective view showing a preferred embodiment of my invention; Fig. 2 is a transverse vertical sectional view of the same; Fig. 3 is a transverse sectional view taken on the line 3—3 of Fig. 2, and Fig. 4 is a plan view looking down upon my device.

Describing more in detail the preferred embodiment herein disclosed, there is provided a receptacle 5 of a general cylindrical form and comprising an outer shell 6 and an inner coating or lining 7, preferably of porcelain. The upper open end of the receptacle is reinforced by a rim or bead 8, and adapted to fit into the receptacle 5 is a cover 9, the diameter of which in its collapsed position, is slightly less than the diameter of the receptacle 5. The cover 9 comprises an outer flanged cap 10. Concentric with this outer cap 10, positioned within the same, and conforming in general to its configuration, is an inner cap 11. Formed between the outwardly-depending flanges 12 and 13 of these cap members, is a ring recess in which is disposed a truncated member, comprising, as shown in Fig. 3, a series of separated wooden strips 15, the lower ends of which are beveled, as shown at 16, and adapted to swing outwardly to closely fit the porcelain lining 7 of the receptacle. The caps 10 and 11 are removably fastened together by any suitable means, as, for instance, bolt connections 17, and these caps are apertured to form a concentrically disposed bearing for the wing nut 18, which wing nut carries, in a threaded boss 19, a bolt 20, the head 21 of which bolt is recessed into a centrally-disposed boss 22 of an inverted dish-shaped actuating cap 23, the depending rim 24 of which is flush with and presses against the flange member 14. In order to facilitate the removal of the wing nut 18, I have provided an offset aperture 25 into which the bolt 20 may be disposed in order to facilitate the disconnection of the several parts.

In making use of this device, I wrap the meat in a suitable covering, place it in the receptacle 5, and by means of any common form of press, force the cap 9 into tight engagement with the meat. Then in order to hold the cover in position, I rotate the wing nut 18, and as the cap 23 cannot further advance being held by the compressed meat, the cover 9 will be forced down and due to the truncated formation of the flange member 14, the cap 23 will act as a circular wedge to expand the flange member, firmly pressing said member into engagement with the side of the receptacle, thereby forming an air-tight rigid joint between these members.

Many changes could be made in the above construction and many apparently widely different embodiments of this invention could be made without departing from the scope thereof. It is intended that all matters contained herein in the above description or shown in the accompanying drawings, shall be interpreted as illustrative and not in a limiting sense. It is also to be understood that the language used in the following claims is merely intended to cover all the generic and specific features of the invention herein described and all statements of the scope of the invention, which, as a matter of language, might be said to fall therebetween, and that materials, sizes and relativities of parts are non-essential, except as called for in the claims.

Having thus described my invention, I claim as new and desire to secure by Letters Patent:

1. In a cooking utensil, a receptacle, a cover adapted to close said receptacle, said cover comprising a pair of caps having concentrically disposed depending flanges formed of separable pieces forming an expansible truncated member disposed between said flanges and adapted to fit within said receptacle, a wedge member disposed within said flange member, a wing nut journaled in one of said caps, and a bolt in threaded engagement with said wing nut and attached to said wedge member, whereby the rotation of said wing nut will force said expansible member into air-tight connection with said receptacle.

2. In a meat cooker, the combination of a vessel, a hollow cover adapted to fit within said vessel, said cover comprising a series of side strips movable relative to one another, to form an expansible side, and a wedge member within said cover acting on said expansible side, whereby a tight connection is formed between said cover and said vessel.

3. In a hollow cover for cooking utensils, a truncated flange member comprising a series of separate strips held together at one end and an inverted dish-shaped member fitting within said flange member and adapted to expand said flange member as it is forced into the same.

4. In a hollow cover for cooking utensils the sides of which cover are formed of separate strips of wood arranged in a truncated cone form and fastened together at the smaller end, the larger end adapted to contact with the inside of the cooking utensil, an inverted dish-shaped cup disposed within the cover and having a rim adapted to press against the strips to force the same into engagement with the inside of the cooking utensil.

5. In a hollow cover for cooking utensils the sides of which cover are formed of separate strips of wood arranged in a truncated cone form and fastened together at the smaller end, the larger end adapted to contact with the inside of the cooking utensil, an inverted dish-shaped cup disposed within the cover and having a rim adapted to press against the strips to force the same into engagement with the inside of the cooking utensil, and means forcing said cup toward the smaller end of said cover.

In testimony whereof I have signed my name to this specification in the presence of two subscribing witnesses.

ADAM REUBOLD.

Witnesses:
W. S. ORTON,
PHILIP D. ROLLHAUS.

---

Copies of this patent may be obtained for five cents each, by addressing the "Commissioner of Patents, Washington, D. C."